2 Sheets--Sheet 2.
ADELIA C. COVELL.
Devices for Teaching Drawing.
No. 139,237. Patented May 27, 1873.
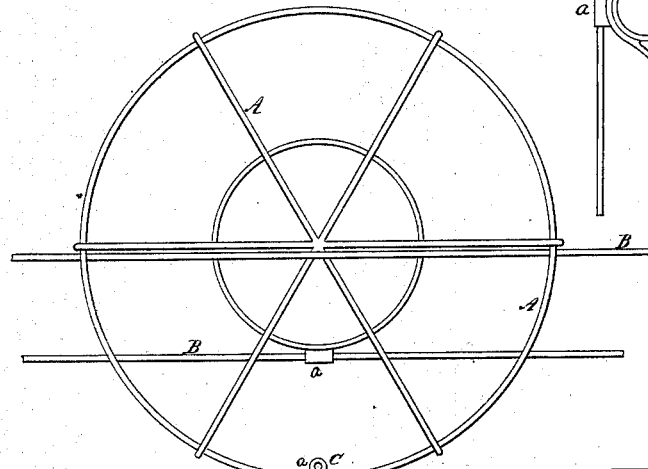
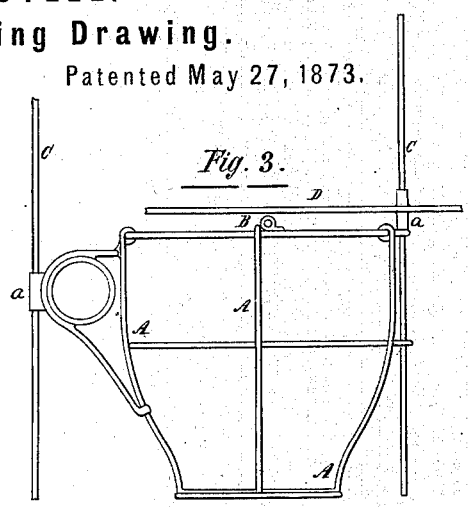
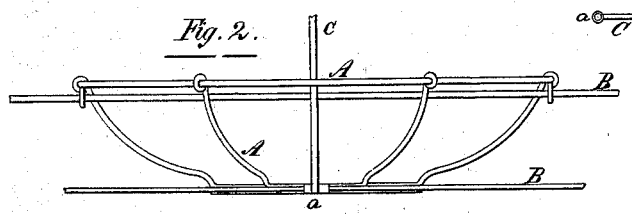
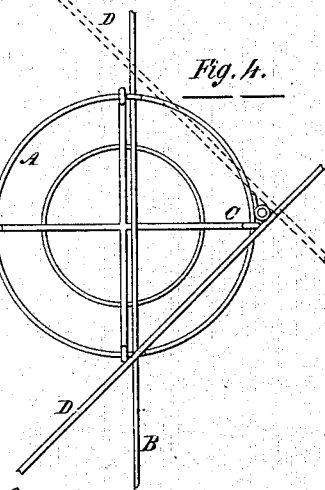
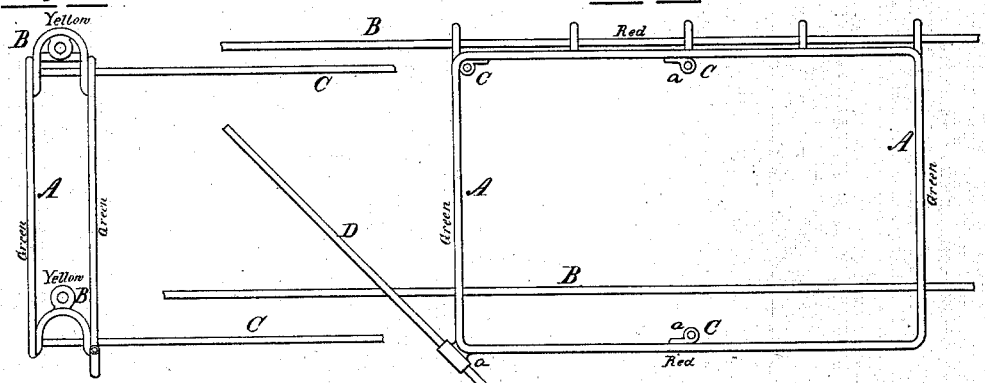
WITNESSES
Adelia C. Covell
INVENTOR.

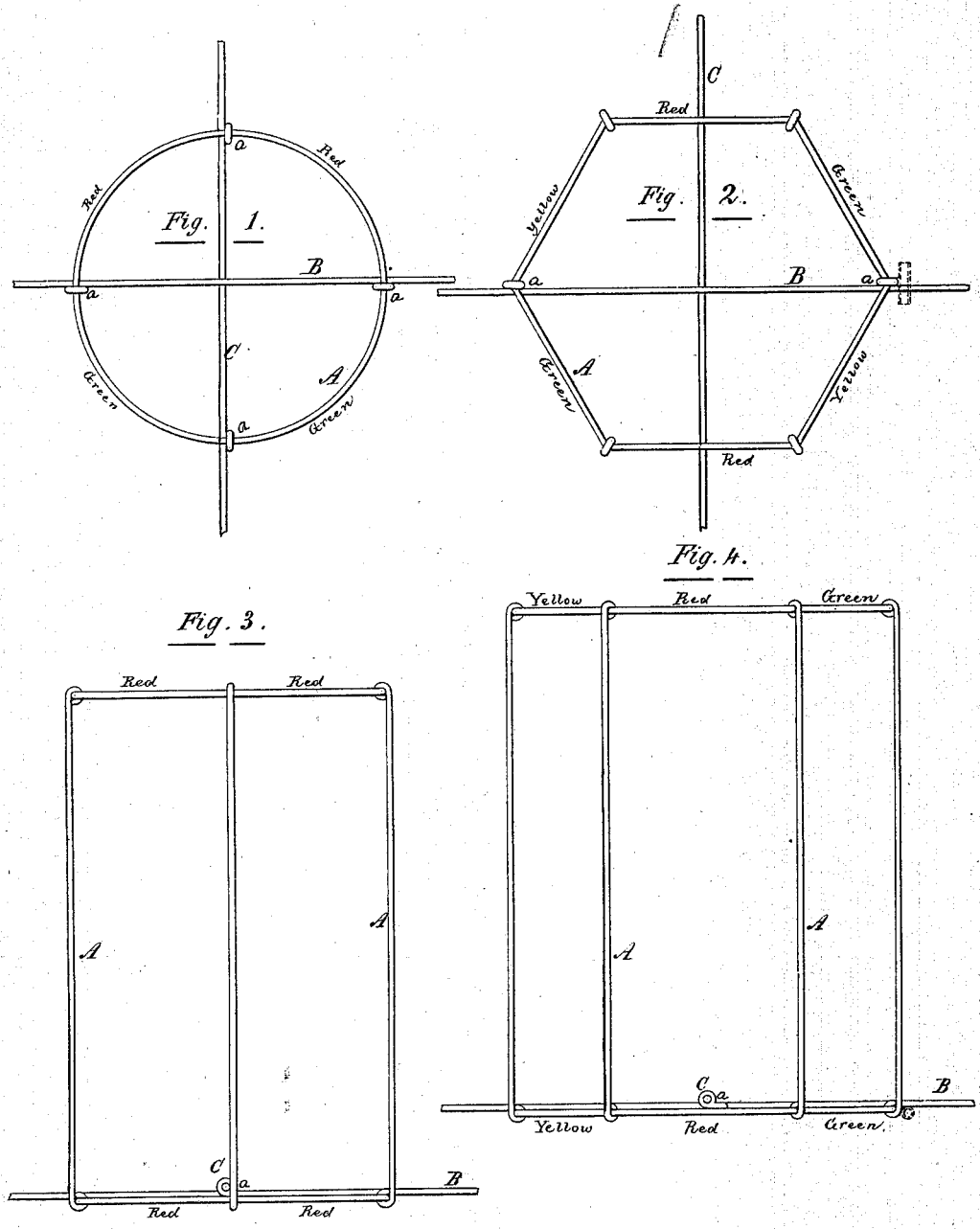

UNITED STATES PATENT OFFICE.

ADELIA C. COVELL, OF NEW YORK, N. Y.

IMPROVEMENT IN DEVICES FOR TEACHING DRAWING.

Specification forming part of Letters Patent No. 139,237, dated May 27, 1873; application filed March 6, 1873.

*To all whom it may concern:*

Be it known that I, ADELIA C. COVELL, of the city, county, and State of New York, have invented, made, and applied to use Improvements in the Construction of Models for use in Teaching Perspective Outline-Drawing; and that the following is a full, clear, and correct description of the same, reference being had to the accompanying drawing making part of this specification and to the letters of reference marked thereon, in which—

Figure 1, Sheet 1, is an end view of a model representing a section of a cylinder. Fig. 2, Sheet 1, is an end view of a model representing a hexagon. Fig. 3, Sheet 1, is a plan view of a model representing a section of a cylinder. Fig. 4, Sheet 1, is a plan view of a model representing a hexagon. Fig. 1, Sheet 2, is a plan view of a model representing a saucer. Fig. 2, Sheet 2, is a side view of the same. Fig. 3, Sheet 2, is a side view of a model representing a cup. Fig. 4, Sheet 2, is a plan view of the same. Fig. 5, Sheet 2, is an end view of a model representing a book. Fig. 6, Sheet 2, is a plan view of the same.

In the drawing, like parts of the invention are indicated by the same letters of reference.

The nature of the present invention consists in certain improvements in the construction, as more fully hereinafter set forth, of models for use in teaching perspective outline-drawing; the object of the invention being to lighten the labor of the teacher and at the same time to enable the student to more readily be instructed in the study of perspective outline-drawing.

To enable those skilled in the arts to make and use my invention, I will describe the construction of the same.

A shows a model, made in any desirable shape from wire or other suitable material, and B, C, and D are separate wires, to be used in connection with the model A, which is provided with loops *a*, through which these wires are passed. B shows what I designate as the horizontal wire, inserted in the model A so as to be parallel to the student, the perspective plane, and the horizon. In this position the student is enabled to measure and determine the "fore-shortening" and perspective outline of the model in one, two, or more directions. C shows what I designate as the vertical wire, passed through eyes or loops *a* in the model A. This wire when placed in position enables the student, from any position in the school-room, to measure and determine the fore-shortening or linear perspective of the object in one, two, or more directions.

In some cases the wire D is used with the wire C; the wire D is provided with a loop, *a*, which is passed over the wire C, so that the wire D is free to move around the wire C, and may be adjusted to it at any right angle, so that it may be placed parallel to any student in the room and to the perspective plane and horizon of the student.

By the employment of these wires combined the student is enabled to measure and ascertain the fore-shortening and perspective outline of the model, which may be either in parallel or oblique perspective, lying at any angle to him or his perspective angle.

It will further be observed that the model A may be composed of a series of wires of different colors; or, if preferable, wires of different-colored metals may be used. The different-colored wires are employed that the student may recognize the lines that are parallel to each other in the model, and are to be so represented in the drawing; and that if any wire of a particular color or material is to be represented by a line drawn to a "vanishing point," all lines of that color or material are to be represented as terminating at the same point; or if the wire is to be represented by a line which does not "vanish," then wires of a like color or of like material must be so represented, and be drawn parallel to this line.

The advantages of models constructed and combined with the wires, as described, are very great. The advantage to the pupil can be easily appreciated by one familiar with the teaching of drawing.

I am aware that wire models of various sizes and shapes have been used for "object-teaching," and consequently lay no claim to them; but I do claim as new—

1. The combination, with the device A, of the wire B, substantially as and for the purpose described.

2. The combination, with the device A, of the wire C, substantially as and for the purpose described.

3. The combination, with the device A, of the wires C and D, substantially as and for the purpose specified.

4. A device for teaching perspective outline-drawing, composed of a series of different-colored wires, or wires formed of different metals, combined substantially as described.

ADELIA C. COVELL.

In presence of—
A. SIDNEY DOANE,
WM. HASTINGS.